US012450311B2

United States Patent
Aggarwal et al.

(10) Patent No.: US 12,450,311 B2
(45) Date of Patent: Oct. 21, 2025

(54) TECHNIQUES FOR DETERMINING CROSS-VALIDATION PARAMETERS FOR TIME SERIES FORECASTING

(71) Applicant: Oracle International Corporation, Redwood Shores, CA (US)

(72) Inventors: Ankit Kumar Aggarwal, Mumbai (IN); Anku Kumar Pandey, New Delhi (IN); Ravijeet Ranjit Kumar, Bangalore (IN); Samik Raychaudhuri, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 845 days.

(21) Appl. No.: 17/694,323

(22) Filed: Mar. 14, 2022

(65) Prior Publication Data

US 2023/0113287 A1  Apr. 13, 2023

Related U.S. Application Data

(60) Provisional application No. 63/254,957, filed on Oct. 12, 2021.

(51) Int. Cl.
*G06F 18/21* (2023.01)
*G06F 18/20* (2023.01)
*G06N 20/20* (2019.01)

(52) U.S. Cl.
CPC ......... *G06F 18/217* (2023.01); *G06F 18/285* (2023.01); *G06N 20/20* (2019.01)

(58) Field of Classification Search
CPC ...... G06F 18/217; G06F 18/285; G06N 20/20
See application file for complete search history.

(56) References Cited

U.S. PATENT DOCUMENTS

2022/0300765 A1* 9/2022 Burba ................... G06N 5/01

OTHER PUBLICATIONS

Bergmeir, Christoph, and José M. Benítez. "On the use of cross-validation for time series predictor evaluation." Information Sciences 191 (2012): 192-213. (Year: 2012).*

(Continued)

*Primary Examiner* — Eric Nilsson
(74) *Attorney, Agent, or Firm* — Kilpatrick Townsend & Stockton LLP

(57) ABSTRACT

A time series forecasting service system is disclosed. The system identifies a set of cross-validation parameters to be used for cross-validating a model to be used for generating a requested forecast. The requested forecast includes a time series dataset and a forecast horizon identifying a number of time steps for which a forecast is to be made using the time series dataset. The system identifies an objective function to be minimized for determining optimal values for the set of cross-validation parameters and identifies constraints for the cross-validation parameters. The system uses an optimization technique to determine the optimal values for the cross-validation parameters. The optimization technique performs processing that determines the optimal values by minimizing the objective function while satisfying the set of constraints. The system uses the optimal values for the cross-validation parameters to perform cross-validation of the model to be used for making the requested forecast.

20 Claims, 10 Drawing Sheets

(56) References Cited

OTHER PUBLICATIONS

Schaffer, Cullen. "Selecting a classification method by cross-validation." Machine learning 13 (1993): 135-143. (Year: 1993).*
Lyla et al., "A Quick Start of Time Series Forecasting with a Practical Example using FB Prophet", Towards Data Science, Available Online at: https://towardsdatascience.com/a-quick-start-of-time-series-forecasting-with-a-practicalexample usingfbprophet31c4447a2274, Jan. 3, 2019, 13 pages.

* cited by examiner

Illustration-1:
N (length of time series) = 15
H (forecast horizon) = 3
frequency = "MONTH"
Cut off elements: (8, 9, 10, 11, 12)
NFOLDS = 5
GBF = 1, LMF = 8

Illustration-2:
N = 24
H = 1
*frequency* = "MONTH"
Disclosed System cutoffs: List (14, 15, 16, 17, 18, 19, 20, 21, 22, 23)
NFOLDS = 10, GBF = 1, LMF = 14

FIG. 5

TECHNIQUES FOR DETERMINING CROSS-VALIDATION PARAMETERS FOR TIME SERIES FORECASTING

CROSS-REFERENCE TO RELATED APPLICATIONS

The present application is a non-provisional application of and claims the benefit and priority under 35 U.S.C. 119(e) of U.S. Provisional Application No. 63/254,957, filed Oct. 12, 2021, entitled "Techniques for Determining Cross-Validation Parameters for Time Series Forecasting," the entire contents of which are incorporated herein by reference for all purposes.

BACKGROUND

A time series or time series dataset is a sequence of data points, measured typically at successive times over a time interval. Examples of time series data include: a set of temperature values captured every day over several days, the price of a stock observed every 5 minutes, monthly sales for a corporation captured over several months, and the like. Time series forecasting refers to a set of forecasting techniques that, given a time series, uses one or more models to forecast an event or observation for a time point in the future. Time series forecasting is used in various fields such as for making economic forecasts, stock market forecasts, product sales forecasts, and so on. The models that are used for analyzing the time series data and for making the forecasts may include, for instance, machine learning models such as neural networks, linear regression models, decision trees and the like.

There are multiple machine learning models that can be used for time series forecasting. Typically, when a machine learning model is used for time series forecasting, an appropriate model has to be first selected based upon the time series data to be used for the forecasting. The model then has to be trained using the time series data. To determine if a model is able to generate forecasts with a desired forecast accuracy, the trained model may then be validated. Cross validation is a commonly used technique for estimating the performance of a trained model. This technique generally involves splitting a time series dataset into a training set, used to fit a model, and a test/validation set, used to determine how well the model performs against a relevant performance (accuracy) metric. A cross-validation technique is generally identified by a number of cross-validation parameters that may be used to estimate/validate the performance of a trained model. By way of example, a cross-validation parameter may identify the number of groups or folds that a given time series dataset may be split into, where each fold consists of a training set on which the model is trained and a validation set on which the performance of the trained model is evaluated.

Selecting the right combination of values to be assigned to a set of cross-validation parameters to build a model with improved model performance can be a challenging and time consuming process. In certain approaches, these values are determined either manually or are estimated using rules that are heuristic-based. Such manual or heuristic approaches are computationally expensive, tend to generate models that are not generalized, and can result in inaccurate model prediction results. There is thus a need for making the processing, including the training and cross-validation of models related to time series forecasting faster and more efficient than is possible in existing implementations.

BRIEF SUMMARY

The present disclosure relates generally to time series forecasting. More specifically, but not by way of limitation, this disclosure describes a time series forecasting service system that provides improved capabilities for determining an optimal combination of values to be assigned to a set of cross-validation parameters to be used for cross-validating a trained model for performing time series forecasting.

In certain embodiments, a time series forecasting service system is disclosed. The system identifies a set of one or more cross-validation parameters to be used for cross-validating a model to be used for generating a requested forecast. The requested forecast includes a time series dataset and a forecast horizon identifying a number of time steps for which a forecast is to be made using the time series dataset. The system identifies an objective function to be minimized for determining optimal values for the set of one or more cross-validation parameters and identifies a set of constraints for one or more cross-validation parameters from the set of cross-validation parameters. In a certain implementation, the objective function is represented as a set of penalty terms. A first penalty term in the set of penalty terms represents a cost of violation of a first constraint in the set of constraints on a first cross-validation parameter in the set of cross-validation parameters, where the first cross-validation parameter represents a left most fold cross-validation parameter for cross-validating the model. A second penalty term in the set of penalty terms represents a cost of violation of a second constraint in the set of constraints on a second cross-validation parameter in the set of cross-validation parameters, where the second cross-validation parameter represents a gap between the folds cross-validation parameter for cross-validating the model.

The system then uses an optimization technique to determine the optimal values for the set of cross-validation parameters, wherein the optimization technique performs processing that determines the optimal values by minimizing the objective function while satisfying the set of constraints. The system then uses the optimal values for the set of cross-validation parameters to perform the cross-validation of the model to be used for making the requested forecast.

In certain examples, the first penalty term is expressed as a divergence of the left most fold cross-validation parameter from an ideal value of the left most fold cross-validation parameter weighted by a first weight value. In certain examples, the second penalty term is expressed as a divergence of the gap between the folds cross-validation parameter from an ideal value of the gap between the folds cross-validation parameter weighed by a second weight value.

In certain examples, the objective function comprises a third penalty term. The third penalty term represents a cost of violation of the first constraint on the left most fold cross-validation parameter when the left most fold cross-validation parameter is out of bounds. In certain examples, the objective function is represented as a sum of the penalty terms. The optimal values for the cross-validation parameters are obtained by determining a sum of the penalty terms that minimizes the objective function.

In certain examples, the system identifies a set of models to be evaluated. For each model in the set of models, the system trains the model and cross-validates the trained model using the optimal values for the set of cross-validation parameters. The system then computes an accuracy metric for the model based on the training and cross-validation.

In certain examples, the system selects a model from the set of models based on the accuracy metric and uses the selected model to generate a forecast value for the requested forecast. In certain examples, the system communicates the forecast value as a response to the forecast request.

In certain examples, the system creates a set of one or more folds in the time series dataset. The number of folds in the set of folds is determined based on the optimal value of the first cross-validation parameter in the set of cross-validation parameters. The first cross-validation parameter represents a left most fold cross-validation parameter for cross-validating the model. In certain examples, the system generates an accuracy metric for the model for each fold in the set of folds and computes the accuracy metric for the model based on the accuracy metrics computed for each fold in the set of folds.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

FIG. 5 depicts a set of illustrations of a set of folds created by the trainer and cross-validation subsystem, according to certain embodiments.

DETAILED DESCRIPTION

The present disclosure relates generally to time series forecasting. More specifically, but not by way of limitation, this disclosure describes a time series forecasting service system that provides improved capabilities for determining an optimal combination of values to be assigned to a set of cross-validation parameters to be used for cross-validating a trained model for performing time series forecasting.

As described above, selecting the right combination of values to be assigned to a set of cross-validation parameters to validate a trained model can be a challenging and time consuming process. The time series forecasting service system described in the present disclosure provides several technical advancements and/or improvements over conventional processes by identifying an objective function that is to be minimized for determining optimal values for a set of cross-validation parameters to be used for cross-validating a trained model to make a requested forecast for a time series dataset. The system uses an optimization technique to determine the optimal values for the set of cross-validation parameters, where the optimization technique performs processing that determines the optimal values by minimizing the objective function while satisfying a set of constraints for the set cross-validation parameters.

The system uses the optimal combination of values to cross-validate a trained model. The model is then used for making requested predictions. By using an optimal combination of cross-validation parameter values to cross-validate a trained model, the disclosed system is able to optimally and efficiently utilize computing resources required for cross-validating a trained model by reducing the time required to validate the trained model using several different combinations of cross-validation parameter values. By determining the optimal values of the cross-validation parameters using an objective function, the disclosed system does not have to cross-validate a trained model multiple times using different combinations of cross-validation parameter values. Thus, the disclosed system is able to optimize the resources required for cross-validating a trained model thereby improving the efficiency of processing, and cross-validation of a trained model related to time series forecasting.

Figure 1:
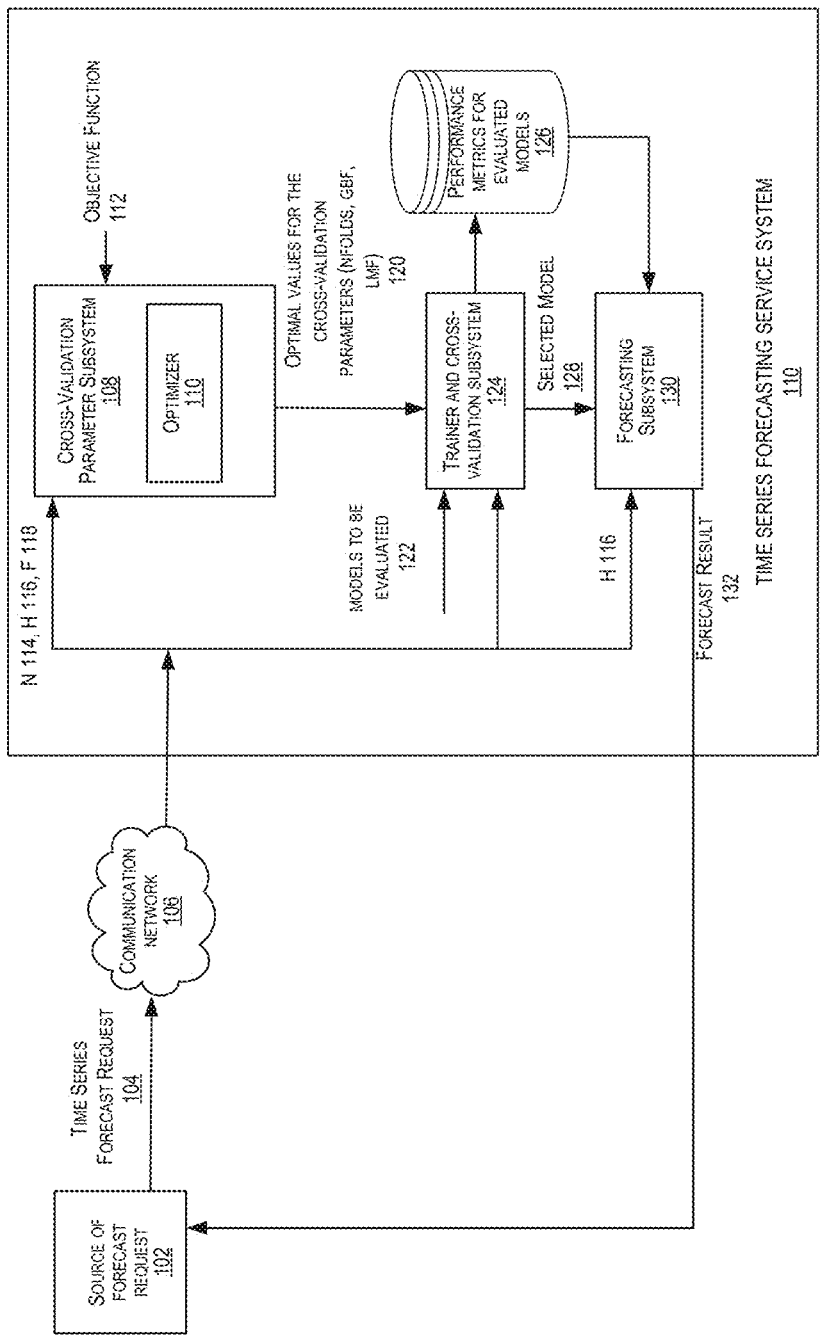
FIG. 1 depicts a computing environment that includes a time series forecasting service system that includes capabilities for determining optimal values for a set of cross-validation parameters for cross-validating a trained model that is to be used for generating a forecast for a time series dataset, according to certain embodiments.

Referring now to the drawings, FIG. 1 depicts a computing environment that includes a time series forecasting service system that includes capabilities for determining optimal values for a set of cross-validation parameters for cross-validating a trained model that is to be used for generating a forecast for a time series dataset, according to certain embodiments. The time series forecasting service system 110 may be implemented by one or more computing systems that execute computer-readable instructions (e.g., code, program) to implement the time series forecasting service system 110. As depicted in FIG. 1, the time series forecasting service system 110 includes various systems and subsystems including a cross-validation parameter subsystem 108, an optimizer 110, a trainer and cross-validation subsystem 124 and a forecasting subsystem 130. Portions of data or information used by or generated by the systems and subsystems 108, 110, 124 and 130 as part of its processing may be stored in a persistent memory data store such as performance metrics for evaluated models data store 126. The systems and subsystems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The time series forecasting service system 110 may be implemented in various different configurations. In certain embodiments, the time series forecasting service system 110 may be implemented on one or more servers of a cloud provider network and its training, cross-validation and forecasting services may be provided to subscribers of cloud services on a subscription basis. Computing environment 100 depicted in FIG. 1 is merely an example and is not intended to unduly limit the scope of claimed embodiments. One of ordinary skill in the art would recognize many possible variations, alternatives, and modifications. For example, in some implementations, the time series forecasting service system 110 can be implemented using more or fewer subsystems than those shown in FIG. 1, may combine two or more subsystems, or may have a different configuration or arrangement of subsystems.

In certain embodiments, the time series forecasting service system 110 provides a fast and reliable service for determining optimal values for a set of cross-validation parameters for cross-validating a trained model that is to be used for generating a forecast for a time series dataset. A cross-validation parameter (also referred to herein as a "cross-validation model parameter") refers to an adjustable parameter whose value may be configured to estimate/validate the performance of a trained model. Cross-validation parameters may be contrasted with regular model parameters that refer to parameters that are internal to a model and that a model learns or estimates from the data during the model training process. For instance, a "number-of-folds" (NFOLDS) cross-validation parameter may be identified as a type of cross-validation parameter for validating a trained model to be used for generating a forecast for a time series dataset. The number-of-folds cross-validation parameter is a cross-validation parameter that attempts to maximize the use of available data for training and testing/validating a model by splitting the data points of the time series dataset into a first subset of data points and a second subset of data points. The first subset of data points are used to fit/train the model (also referred to herein as a training set) and the second subset of data points are used to determine how well the trained model performs against a relevant performance metric (also referred to herein as a test/validation set). Other types of cross-validation parameters for validating a trained model to be used for generating a forecast for a time series dataset may include, but are not limited to, a "gap-between-folds" (GBF) cross-validation parameter and a "left-most-fold" (LMF) cross-validation parameter. The "gap-between-folds" cross-validation parameter determines the gap between left-ends of adjacent folds and the "left-most-fold" cross-validation parameter determines the length of the training set in the left-most fold. Additional details of the representation and implementation of the various cross-validation parameters associated with a time series dataset are described in FIG. 5.

As depicted in FIG. 1, a time series forecast request (e.g., 104) may be received from a source 102 that is communicatively coupled to the time series forecasting service system 110 possibly via a communication network 106 (e.g., the Internet). The source 102 may represent a user device of an entity such as a customer (e.g., an organization, an enterprise, or an individual) who subscribes to the services provided by the time series forecasting service system 110. The user device may be of various types, including but not limited to, a mobile phone, a tablet, a desktop computer, and the like. A user of the entity may interact with the time series forecasting service system 110 using a browser executed by the user device. For example, the user may use a user interface (UI) (which may be a graphical user interface (GUI)) of the browser executed by the user device to interact with the time series forecasting service system 110. In other examples, the source 102 may also represent an external service that generates a forecast request for an entity such as a customer (e.g., an organization, an enterprise, or an individual) who subscribes to the services provided by the time series forecasting service system 110.

In certain examples, the time series forecast request 104 includes a time series dataset and a forecast horizon identifying a time point for which a forecast is requested. The time series dataset includes historical data points based upon which the forecast is to be made. The data points are recorded in time order and each data point in the time series dataset comprises a value (e.g., an observed value) and an associated time. The forecast request 104 is received by a cross-validation parameter subsystem 108 in the time series forecasting service system 110. Based on the forecast request, the cross-validation parameter subsystem 108 derives/determines a set of input parameters that characterize the time series data set. By way of example, the input parameters may include the number of data points (N 114) in the time series dataset, the forecast horizon (H) identifying a time point for which a forecast is requested and the frequency (hourly, daily, weekly, monthly, quarterly or yearly) of arrival of the data points in the time series dataset. For instance, based on a forecast request, the cross-validation parameter subsystem 108 may determine that the number of data points N in the time series data set is =16, the forecast horizon, H=2 and the frequency, F, of arrival of the data points is "hourly."

Based on the set of input parameters, N 114, H 116 and F 118, the cross-validation parameter subsystem 108 then identifies a set of cross-validation parameters to be used for cross-validating a trained model to make the requested forecast for the time series dataset. In a certain implementation, the set of cross-validation parameters include the "number-of-folds" (NFOLDS) cross-validation parameter, the "gap-between-folds" (GBF) cross-validation parameter and the "left-most-fold" (LMF) cross-validation parameter described above. The cross-validation parameter subsystem 108 then determines optimal values for the set of cross-validation parameters for cross-validating a trained model to be used for generating a forecast for the time series dataset. In a certain implementation, the cross-validation parameter subsystem 108 uses an optimizer 110 that uses an objective function 112 and one or more optimization techniques to estimate the optimal combination of cross-validation parameter values that results in the generation of a model with improved performance. Additional details of the optimization process performed by the optimizer 110 is discussed in FIG. 2 and FIG. 3. As a result of the optimization process performed by the optimizer 110, the cross-validation parameter subsystem 108 provides a set of optimal cross-validation parameter values to the trainer and cross-validation subsystem 124.

The trainer and cross-validation subsystem 124 performs the training of a model and cross-validation of the trained model using a set of models 122 and based on the optimal values of the cross-validation parameters 120 determined by the cross-validation parameter subsystem 108. Additional details of the cross-validation process performed by the trainer and cross-validation subsystem 124 is discussed in FIG. 2 and FIG. 4. As a result of the cross-validation process, the trainer and cross-validation subsystem 124 selects a model with a highest accuracy (performance) metric and provides the selected model 128 to the forecasting subsystem 130. The forecasting subsystem 130 uses the selected model to predict a forecast result 132 where the forecast result includes a value predicted for a future time point for the time series dataset.

Figure 2:
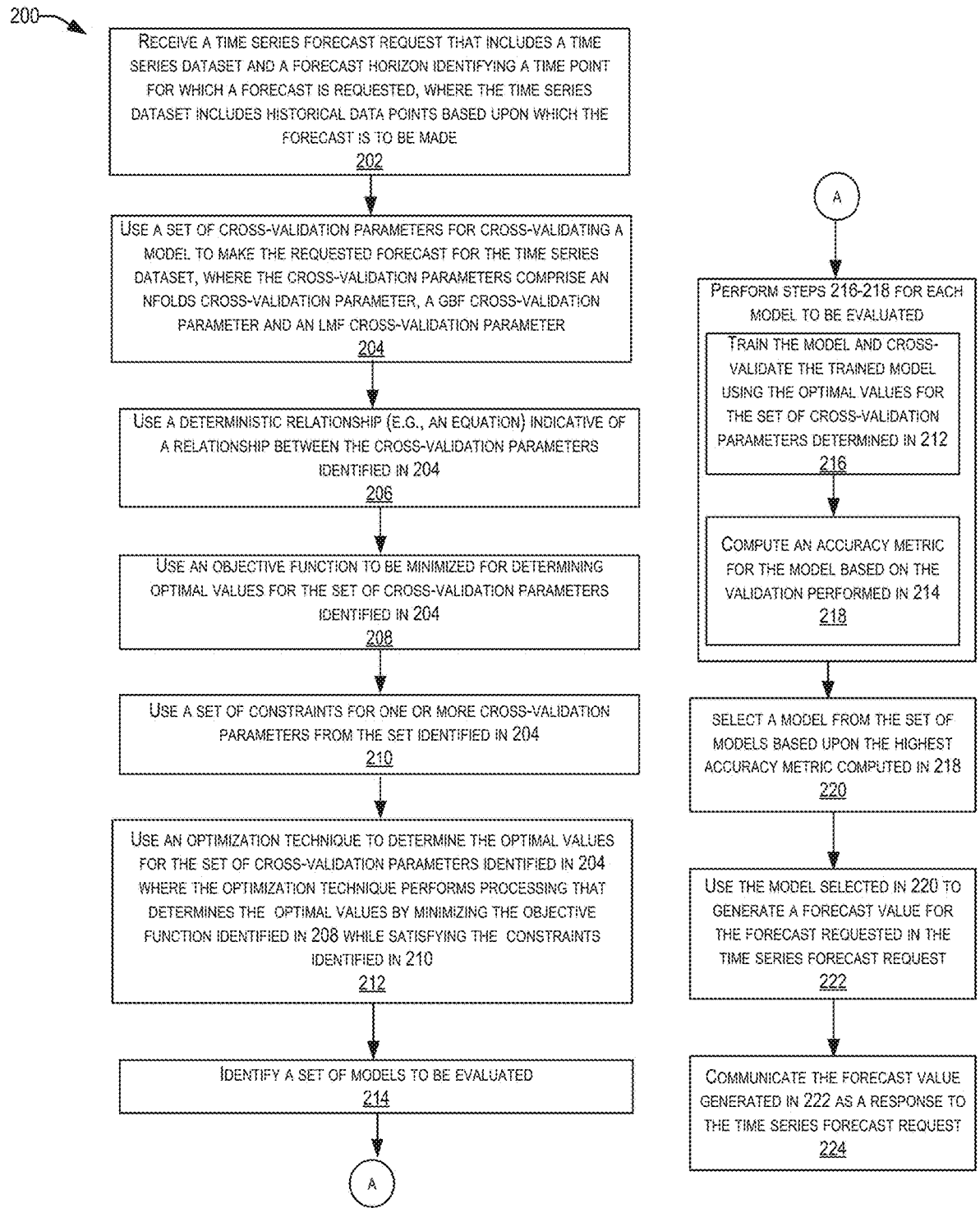
FIG. 2 depicts an example of a process by which the time series forecasting service system shown in FIG. 1 determines optimal values for a set of cross-validation parameters for cross-validating a trained model to be used for generating a forecast for a time series dataset, according to certain embodiments.

FIG. 2 depicts an example of a process 200 by which the time series forecasting service system 110 shown in FIG. 1 determines optimal values for a set of cross-validation parameters for performing the cross-validation of a trained model to be used for generating a forecast for a time series dataset, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order, or some steps may also be performed in parallel. In certain embodiments, such as in the embodiment depicted in FIG. 1, the data processing depicted in FIG. 2 may be performed by the cross-validation parameter subsystem 108, the optimizer 110, the trainer and cross-validation subsystem 124 and the forecasting subsystem 130 in the time series forecasting service system 110.

The processing depicted in FIG. 2 may be initiated when, at block 202, a time series forecast request (e.g., 104) is received for processing by the cross-validation parameter subsystem 108. As previously described, the time series forecast request 104 includes a time series dataset and a forecast horizon identifying a time point for which a forecast is requested, where the time series dataset includes historical data points based upon which the forecast is to be made.

At block 204, the cross-validation parameter subsystem 108 uses a set of cross-validation parameters to be used for cross-validating a model to make the requested forecast for the time series dataset. In a certain implementation, the cross-validation parameters comprise the "number-of-folds" (NFOLDS) cross-validation parameter, the "gap-between-folds" (GBF) cross-validation parameter and the "left-most-fold" (LNF) cross-validation parameter described above.

At block 206, the cross-validation parameter subsystem 108 uses a deterministic relationship (using equation 1 shown below) that is indicative of a relationship between the set of cross-validation parameters identified in 204. For instance, the cross-validation parameter subsystem 108 may determine a value of the left-most-fold (LNF) cross-validation parameter based on a value of the number of folds (NFOLDS) cross-validation parameter and a value of the gap between the folds (GBF) cross-validation parameter using equation (1) as shown below:

$$LMF = (N - H - (NFOLDS - 1) * GBF) / N \quad \text{Equation (1)}$$

At block 208, the cross-validation parameter subsystem 108 identifies/uses an objective function to be minimized for determining optimal values for the set of cross-validation parameters identified in 204.

At block 210, the cross-validation parameter subsystem 108 identifies/uses a set of constraints for one or more cross-validation parameters from the set of cross-validation parameters identified in 204.

In a certain implementation, the objective function is represented as a penalty function (also referred to herein as a penalty equation) whose value is to be minimized over the set of cross-validation parameters subject to a set of constraints that restrict the values of the cross-validation parameters. In certain examples, the objective function may be expressed as a set of penalty terms, where each penalty term represents a cost of violation of a constraint on a cross-validation parameter. The objective function may be represented as shown in equation (2) below:

$$\text{Objective Function} = \text{penalty\_left\_most\_fold} + \text{penalty\_gap\_btw\_folds} + \text{penalty\_oob\_left\_most\_fold} \quad \text{Equation (2)}$$

where the objective function is minimized subject to the following constraints on one or more cross-validation parameters in the set of cross-validation parameters:

Constraint 1: $5 \leq \text{nfolds} \leq 10$

The first constraint (constraint 1) is a condition on the number-of-folds (NFOLDS) cross-validation parameter that defines a lower limit (5) and an upper limit (10) on a set of allowed values that can be assigned to the NFOLDS cross-validation parameter. For example, based on the first constraint, the set of allowed values that can be assigned to the NFOLDS cross-validation parameter may include a set of values (5, 6, 7, 8, 9 and 10).

Constraint 2: $1 \leq \text{gbf} \leq \text{max\_abs\_gap}$, where max_abs_gap is a function of the frequency of arrival of the data points in the time series dataset.

The second constraint (constraint 2) is a condition on the GBF cross-validation parameter that defines a lower limit (e.g., 1) and an upper limit (e.g., max-abs-gap) on a set of allowed values that can be assigned to the GBF cross-validation parameter. In certain examples, the max-abs-gap may be derived as a function of the frequency of arrival of the data points in the time series dataset. For each frequency, there is a pre-defined maximum allowed gap between consecutive folds which is used for setting the upper limit of the gap between the consecutive folds. For example, the gap between folds for weekly data may be varied between 1 to 65 where 65 is the pre-defined upper limit for weekly data.

Constraint 3: $0.15 \leq \text{lmf} \leq 0.95$

The third constraint (constraint 3) is a condition on the left-most-fold cross-validation parameter that defines a set of bounds (a lower limit (0.15) and an upper limit (0.95)) on a set of allowed values that can be assigned to the LMF cross-validation parameter. In other words, this constraint specifies that the length of the training dataset in the left most fold of the time series dataset should be a value that is between 15%-95% of the data values contained in the time series dataset. Additional details and examples of the representation of the left most fold in a time series dataset is described in FIG. 5.

In certain examples, the first penalty term, penalty_left_most_fold in the objective function shown in equation (2) represents a set of values of the left-most-fold cross-validation parameter, that are penalized in the objective function if, and based on the extent that, the left-most-fold cross-validation parameter value diverges from an ideal value of the left-most-fold position. In a certain implementation, the first penalty term may be generically represented using equation (3) below:

$$\text{penalty\_left\_most\_fold} = \|\text{weight} * (\text{divergence from ideal left\_most\_fold position})\|_n, \text{ where } \|\cdot\|_n \text{ is } L^n\text{-norm function} \quad \text{Equation 3}$$

The second penalty term, penalty_gap_btw_folds in the objective function represents a set of values of the gap-between-folds cross-validation parameter, that are penalized in the objective function if, and based on the extent that, the gap-between-folds cross-validation parameter value diverges from an ideal value of the between-folds cross-validation parameter. In a certain implementation, the second penalty term may be generically represented using equation (4) below:

$$\|weight*(divergence\ from\ ideal\_gap\_btw\_folds)/ideal\_gap\_btw\_folds)\|_n \quad \text{Equation 4}$$

The third penalty term, penalty_oob_left_most_fold in the objective function represents a large penalty value when the left-most-fold cross-validation parameter value is out of bounds. In a certain implementation, the third penalty term may be represented using equation (5) below:

$$(100{,}000\ \text{if}\ left\_most\_fold<0.15\ \text{or}\ left\_most\_fold>0.95\ \text{else}\ 0) \quad \text{Equation (5)}$$

In a certain implementation, a particular/specific form of the objective function in equation (2) may be expressed as shown in equation (6) below:

$$\text{Objective Function}=(5*(left\_most\_fold-0.5))^2+((gap\_btw\_folds-H)/H)^2+(100{,}000\ \text{if}\ left\_most\_fold<0.15\ \text{or}\ left\_most\_fold>0.95\ \text{else}\ 0). \quad \text{Eq(6)}$$

where the ideal value of the ideal left_most_fold (LMF) position is 0.5 and the ideal value of the gap-between-folds (GBF) is H (the forecast horizon).

At block 212, the cross-validation parameter subsystem 108 uses an optimization technique to determine the optimal values for the set of cross-validation parameters identified in 204 where the optimization technique performs processing that determines the optimal values by minimizing the objective function identified in 208 while satisfying the constraints identified in 210. In a certain implementation, the optimal values for the set of cross-validation parameters are determined by the optimizer 110 within the cross-validation parameter subsystem 108. The optimization techniques used by the optimizer 110 may include, but are not limited to, Bayesian optimization, grid search optimization and the like. Additional details of the processing performed by the optimizer 110 to determine the optimal values are described in FIG. 3. As part of the processing performed in 212, the cross-validation parameter subsystem 108 provides the optimal values determined for the set of cross-validation parameters to the trainer and cross-validation subsystem 124.

At block 214, the trainer and cross-validation subsystem 124 identifies a set of models (e.g., 122) to be evaluated. These models may include, but are not limited to, autoregressive integrated moving average (ARIMA) models, exponential smoothing (ETS) models, moving average (MA) models, prophet models, and the like. The trainer and cross-validation subsystem 124 then performs the processing in blocks 216 and 218 for each model in the set of models to be evaluated. For example, at block 216, the cross-validation subsystem 124 trains a model from the set of models and cross-validates the trained model using the optimal values for the set of cross-validation parameters determined in 212. At block 218, the cross-validation subsystem 124 computes an accuracy metric for the model based on the cross-validation performed in 216. In certain examples, the accuracy metric may correspond to a forecast metric such as Mean Absolute Percentage Error (MAPE), Symmetric Mean Absolute Percentage Error sMAPE, Root Mean Squared Error (RMSE), Mean Absolute Error (MAE) and so on.

At block 220, the cross-validation subsystem 124 selects a model from the set of models based upon the highest accuracy metric (e.g., lowest MAPE or RMSE computed in 218).

At block 222, the forecasting subsystem 124 uses the model selected in 220 to generate a forecast value for the forecast requested in the time series forecast request.

At block 224, the forecasting subsystem 124 communicates the forecast value generated in 222 as a response to the time series forecast request.

As previously described, as part of the processing performed in 212, the optimizer 110 determines the optimal values for the set of cross-validation parameters by minimizing the objective function while satisfying the set of constraints. The following pseudo-code demonstrates the processing performed by the optimizer to determine the optimal values for the set of cross-validation parameters.

Initialize the set "AllowedValuesGBF" to values based upon the constraints on the GBF cross-validation parameter (e.g., constraint 2);

Initialize the set "AllowedValuesNFolds" to values based upon the constraints on NFOLDS cross-validation parameter (e.g., constraint 1);

Initialize iterationResults=An empty list of tuples each containing four elements to save the best result for each iteration of outer loop below

```
/* outer loop starts */
For each gbf_value in the set AllowedValuesGBF
{
    Initialize prevPenalty = a very high number;
    /* inner loop starts */
    For each nfolds_value in the set of AllowedValuesNFolds
    {
        LMF = Determine value for LMF by using Eq(1) and using the current value of gbf_value and nfolds_value;
        currentPenalty = value obtained using Eq(2) and current values of nfolds_value, LMF, and gbf_value;
        if currentPenalty < prevPenalty
        {
            prevPenalty = currentPenalty;
            bestNFOLDS = current value of n_folds
```

```
        bestGBF= current value of gbf
        bestLMF = current value of LMF
      }
    }
  }
  /* inner loop ends */
  /* update iterationResults */
  Add the tuple (prevPenalty, bestNFOLDS, bestGBF, bestLMF) to iterationResults
}
/* outer loop ends */
selectedTuple = the tuple having least value of prevPenalty from iterationResults.
Output:
Suggested optimal value for NFOLD = NFOLDS from selectedTuple;
Suggested optimal value for LMF = LMF from selectedTuple;
Suggested optimal value for GBF = GBF from selectedTuple;
```

Figure 3:
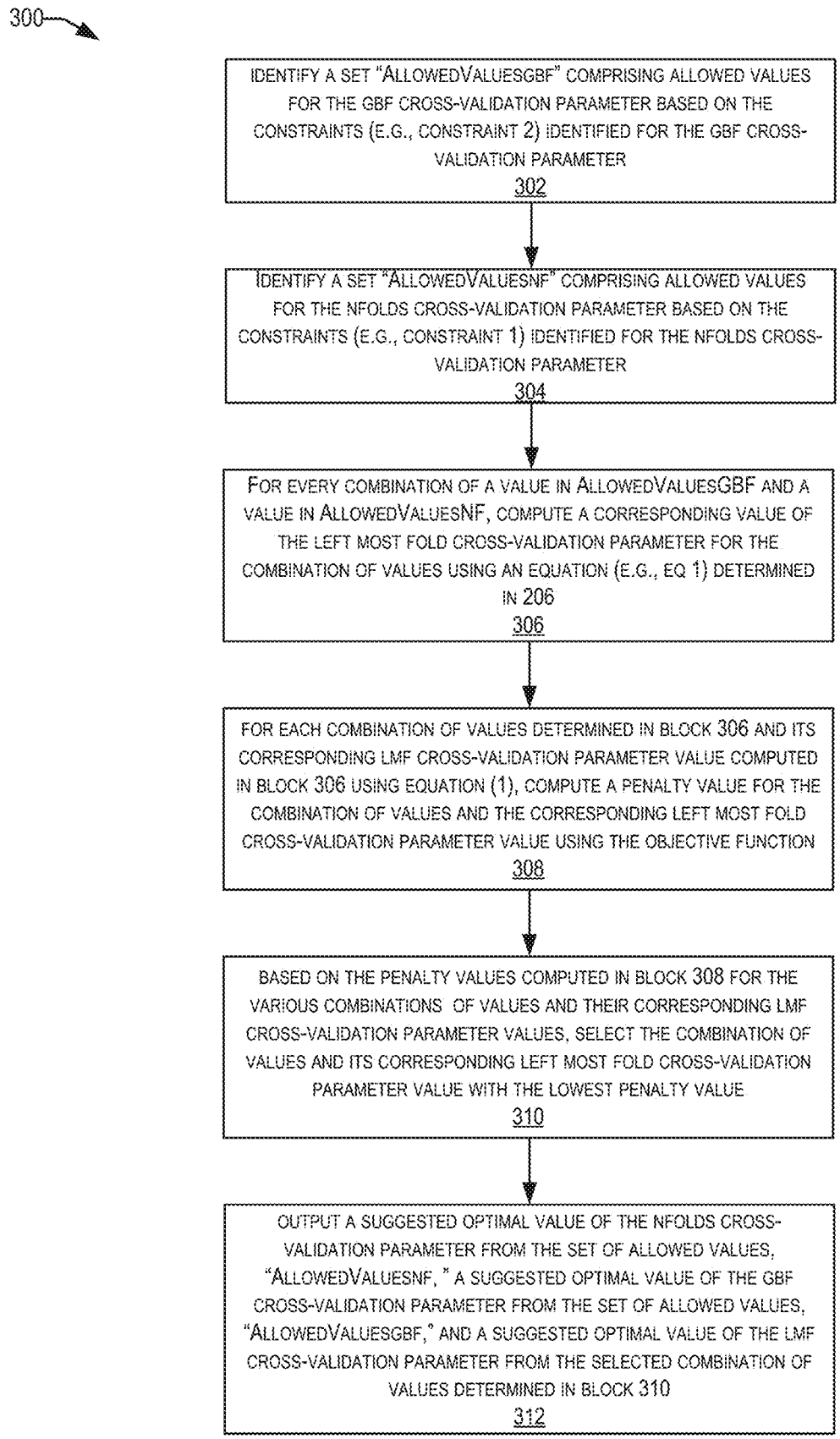
FIG. 3 depicts additional details of the processing performed by the time series forecasting service system 110 shown in FIG. 1 to determine optimal values for a set of cross-validation parameters to be used for cross-validating a trained model to make a requested forecast for a time series dataset, according to certain embodiments.

FIG. 3 depicts an example of a process 300 by which the time series forecasting service system 110 shown in FIG. 1 determines optimal values for a set of cross-validation parameters to be used for cross-validating a trained model to make a requested forecast for a time series dataset, according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order, or some steps may also be performed in parallel. In certain embodiments, such as in the embodiment depicted in FIG. 1, the processing depicted in FIG. 3 may be performed by the optimizer 110 in the cross-validation parameter subsystem 108.

At block 302, the optimizer 110 identifies a set "AllowedValuesGBF" comprising allowed values for the GBF cross-validation parameter based on the constraints (e.g., constraint 2) identified for the GBF cross-validation parameter.

At block 304, the optimizer 110 identifies a set "AllowedValuesNF" comprising allowed values for the NFOLDS cross-validation parameter based on the constraints (e.g., constraint 1) identified for the NFOLDS cross-validation parameter.

At block 306, for every combination of a value in AllowedValuesGBF and a value in AllowedValuesNF, the optimizer 110 computes a corresponding value of the left_most_fold cross-validation parameter for the combination of values using equation (1).

At block 308, for each combination of values determined in block 306 and its corresponding LMF cross-validation parameter value computed in block 306 using equation (1), the optimizer 110 computes a penalty value for the combination of values and the corresponding left_most_fold cross-validation parameter value using the objective function shown in equation (2).

At block 310, based on the penalty values computed in block 308 for the various combinations of values and their corresponding LMF cross-validation parameter values, the optimizer 110 selects the combination of values and its corresponding left_most_fold cross-validation parameter value with the lowest penalty value.

At block 312, the optimizer 110 outputs a suggested optimal value of the number-of-folds (NFOLDS) cross-validation parameter from the set of allowed values, "AllowedValuesNF," a suggested optimal value of the gap-between-folds (GBF) cross-validation parameter from the set of allowed values, "AllowedValuesGBF," and a suggested optimal value of the left-most-fold (LMF) cross-validation parameter from the selected combination of values determined in block 310.

Figure 4:
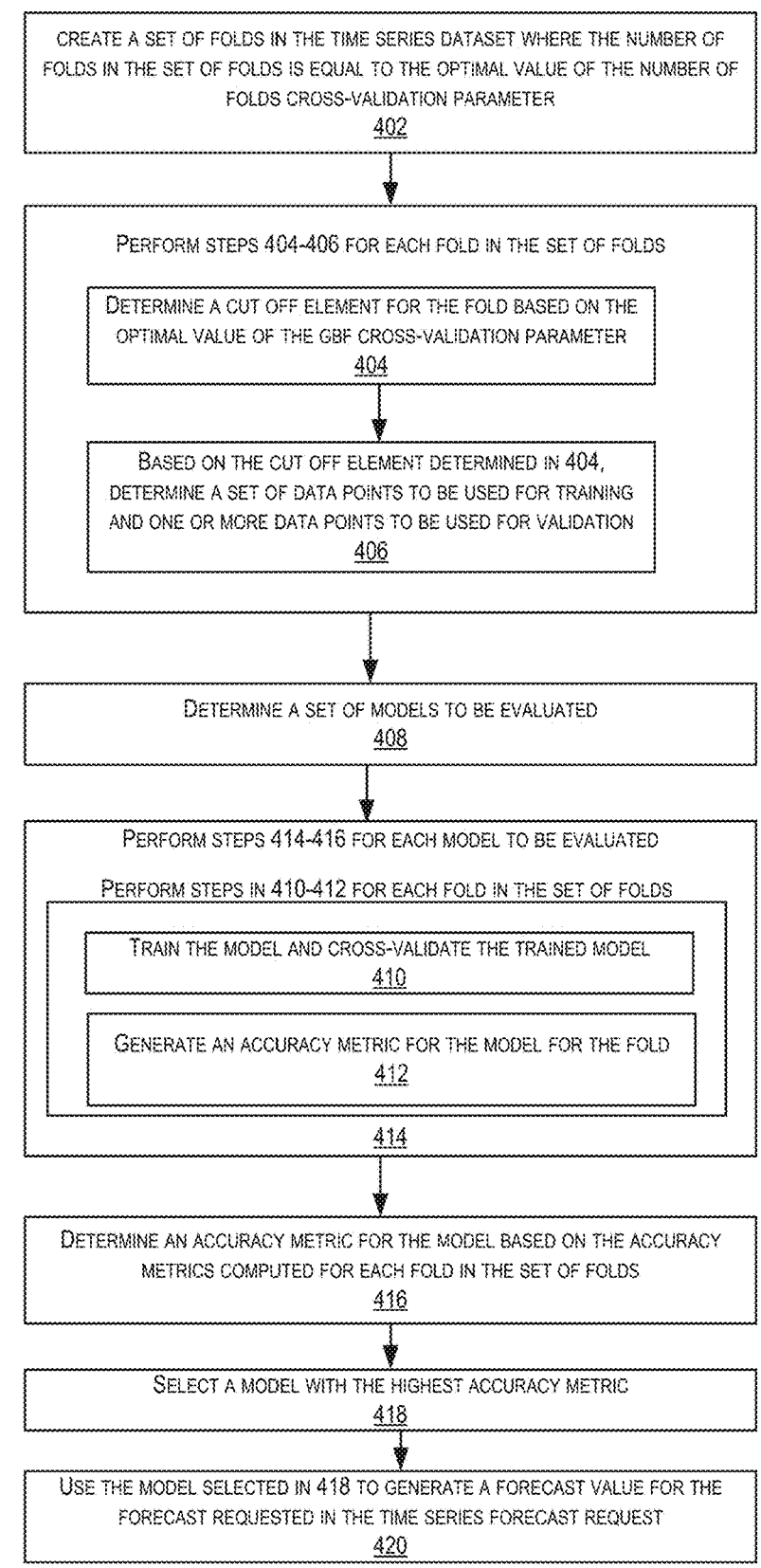
FIG. 4 depicts an example of a process by which the time series forecasting service system 110 shown in FIG. 1 performs the training and cross-validation of a model used to make a requested forecast for a time series dataset, according to certain embodiments.

FIG. 4 depicts an example of a process 400 by which the time series forecasting service system 110 shown in FIG. 1 performs the cross-validation of a model used to make a requested forecast for a time series dataset, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order, or some steps may also be performed in parallel. In certain embodiments, such as in the embodiment depicted in FIG. 1, the processing depicted in FIG. 4 may be performed by the trainer and cross-validation subsystem 124 and the forecasting subsystem 130.

The processing depicted in FIG. 4 is initiated when the trainer and cross-validation subsystem 124 obtains the optimal values of the cross-validation parameters from the optimizer 110. At block 402, the trainer and cross-validation subsystem 124 creates a set of folds in the time series dataset where the number of folds in the set of folds is equal to the optimal value of the NFOLDS parameter. For instance, if the optimizer 110 determines that the optimal value of the NFOLDS cross-validation parameter=5, then, the cross-validation subsystem 124 creates 5 folds in the time series dataset. In a certain implementation, the trainer and cross-validation subsystem 124 may utilize a cross-validation technique, such as a Rolling Origin Cross Validation (ROCV) technique to create a set of folds in the time series dataset. The ROCV technique uses a data partitioning strategy to create multiple folds, where each fold consists of a training set on which a model is trained, and a validation set on which the performance of the trained model is evaluated. Each fold is characterized by a certain "gap between the folds" value. In an example, the gap between the folds value is equal to the optimal value of the GBF value determined by the optimizer. The set of folds is additionally identified by a left_most_fold whose value identifies the length of the training data in the left_most_fold. In an embodiment, the left most fold value is equal to the optimal value of the LMF value determined by the optimizer. In certain examples, the cross-validation parameters (NFOLDS, GBF and LMF) may be referred to as ROCV parameters. Details of the representation of the ROCV parameters, NFOLDS, GBF and LMF associated with a time series dataset are shown in FIG. 5.

FIG. 5 depicts a set of illustrations of a set of folds created by the trainer and cross-validation subsystem 124 according to certain embodiments. In the first illustration-1, based on the optimal values of the NFOLDS, GBF and the LMF, the time series dataset is split into 5 folds, where the gap between the folds is =1 and the length of the training data in the left-most fold=8. In the second illustration-2, based on the optimal values of the NFOLDS, GBF and the LMF, the time series dataset is split into 10 folds, where the gap between the folds is =1 and the length of the training data in the left-most-fold=14.

Returning to the discussion of FIG. 4, the trainer and cross-validation subsystem 124 then performs the steps in 404-406 for each fold in the set of folds. At block 404, the trainer and cross-validation subsystem 124 determines a cut off element for the fold based on the optimal value of the GBF cross-validation parameter. In a certain implementation, the cut off element is determined using the optimal value of the GBF cross-validation parameter using equation (7) below:

$$\text{cut off element for fold}(i): N-H-(i-1)*gbf \qquad \text{Equation (7)}$$

where i ranges from 1 to NFOLDS.
For instance, based on illustration 1 shown in FIG. 5, when N=15, GBF=1, and H=3, the cut off element for the fold (fold 1)=12.

At block 406, based on the cut off element determined in 404, the trainer and cross-validation subsystem 124 determines a set of data points to be used for training and one or more data points to be used for validation. For instance, if the cut off element for fold 1=12, 12 data points are used for training and 3 data points are used for validation.

At block 408, the trainer and cross-validation subsystem 124 determines a set of models to be evaluated. The trainer and cross-validation subsystem 124 then performs steps 414-416 for each model to be evaluated. At block 414, the trainer and cross-validation subsystem 124 generates an accuracy metric for the model for each fold in the set of folds. As part of the processing performed in block 414, the trainer and cross-validation subsystem 124 performs steps 410-412 for each fold in the set of folds. At block 410, the trainer and cross-validation subsystem 124 trains the model and cross-validates the trained model. At block 412, the trainer and cross-validation subsystem 124 generates an accuracy metric for the model (i.e., the trained model) for the fold. At block 416, the trainer and cross-validation subsystem 124 determines an accuracy metric for the model based on the accuracy metrics computed for each fold in the set of folds.

At block 418, the trainer and cross-validation subsystem 124 selects a model with the highest accuracy metric and at block 420, the trainer and cross-validation subsystem 124 uses the model selected in 418 to generate a forecast value for the forecast requested in the time series forecast request.

The disclosed system includes capabilities for determining optimal values for a set of cross-validation parameters for cross-validating a trained model that is to be used for generating a forecast for a time series dataset. In a certain implementation, and as described above, the disclosed system uses an optimizer that uses an objective function and one or more optimization techniques to determine the optimal combination of cross-validation parameter values that results in the generation of a model with improved performance. The system uses the optimal values for the set of cross-validation parameters to perform the training and cross-validation of the trained model to be used for making the requested forecast. As part of the cross-validation process, the disclosed system creates a set of folds in the time series dataset. Each fold consists of a training set on which a model is trained, and a validation set on which the performance of the trained model is evaluated. The disclosed system determines a cut off element for each fold based on the optimal values of the cross-validation parameters. By determining a cut off element for each fold in a set of folds in a time series data set based on the optimal values of the cross-validation parameters as described above, the disclosed system is able to determine the optimal set of data points to be used for training a model and the optimal set of data points to be used for cross-validating the trained model. This results in the generation of a model with improved forecast accuracy than is possible in existing implementations.

One of the many challenges faced by existing forecasting tools while performing cross-validation of a trained model is their ability to determine the number of validation data points to be used during the cross-validation process that results in the generation of a robust model with improved model prediction. In many instances, the number of cut off elements computed by existing tools may be either too low or too high resulting in lower model performance and inaccurate model prediction results. For instance, a low number of cut off elements can result in model overfitting thereby resulting in lower performance of the model on unseen data. Similarly, a high number of cut off elements can potentially result in a computationally expensive cross-validation process.

The following examples illustrate cutoff values determined by the disclosed system 110 for each fold in a set of folds for a given time series dataset. The improvement in the cut off values computed by the disclosed system are contrasted with the cut off values computed by existing prior art techniques (e.g., forecasting tools) that include capabilities to forecast time series data.

Example 1

N (length of time series)=15
H (forecast horizon)=3
frequency="MONTH"
Disclosed System cutoff list (8, 9, 10, 11, 12)
Prior Art Technique cutoff list: (10, 12)
NFOLDS=5, GBF=1, LMF=8

In example 1 shown above and its corresponding illustration (illustration-1) shown in FIG. 5, based on the optimal values of the NFOLDS, GBF and the LMF cross-validation parameter values determined by the disclosed system 110, the time series dataset is split into 5 folds (NFOLDS=5), where the gap between the folds (GBF) is =1 and the length of the training data in the left-most fold (LMF)=10. The cut off elements computed by the disclosed system was determined to be (8, 9, 10, 11, 12).

The cut off list denotes the indices of the end points of the training part of the cross-validation folds. There are as many cross-validation folds as the number of indices in the cutoff list. For instance, a cutoff value of 12 indicates that training occurs on the time series dataset starting at index 1 and ending at index 12 and validation occurs on the next three data points (i.e., corresponding to indices 13 to 15 since the forecast horizon (H)=3). Similarly, for a cutoff index 11, the training occurs on the time series dataset starting at 1 and ending at 11 and validation occurs on the next three data points (i.e., indices 12 to 14). The data point after index 12 is not considered for this fold.

The cut off elements computed by the prior art forecasting tool for example-1 was determined to be (10, 12). As may be observed, the cut off elements computed for the time series dataset by the prior art tool for this example resulted in a relatively low (i.e., 2) number of cutoff elements. A low number of cutoffs (e.g., less than 5) can potentially lead to model overfitting, thereby resulting in lower performance of the model on unseen data.

Example 2

N=24
H=1
frequency="MONTH"
Disclosed System cutoff list: (14, 15, 16, 17, 18, 19, 20, 21, 22, 23)
Prior Art Technique cutoff list: (3, 4, 5, 6, 7, 8, 9, 10, 11, 12, 13, 14, 15, 16, 17, 18, 19, 20, 21, 22, 23)
NFOLDS=10, GBF=1, LMF=14

In example 2 shown above and its corresponding illustration (illustration-2) shown in FIG. 5, based on the optimal values of the NFOLDS, GBF and the LMF cross-validation parameter values determined by the disclosed system 110, the time series dataset is split into 10 folds (NFOLDS=10), where the gap between the folds (GBF) is =1 and the length of the training data in the left-most fold (LMF)=14. The cut off elements computed by the disclosed system was determined to be (14, 15, 16, 17, 18, 19, 20, 21, 22, 23).

The cut off elements computed by the prior art forecasting tool for example-2 was determined to be (3, 4, 5, 6, 7, 8, 9, 10, 11, 12, 13, 14, 15, 16, 17, 18, 19, 20, 21, 22, 23). As may be observed, the cut off elements computed for the time series dataset by the prior art tool for this example resulted in a relatively high (i.e., 21) number of cutoff elements. A high number of cutoffs can potentially result in a computationally expensive cross-validation process since a separate model may need to be built for each of the cutoff elements.

Example 3

N=18
H=6
frequency="MONTH"
Disclosed System cutoff list (8, 8, 19, 11, 12)
Prior Art Technique cutoff list: No cutoffs computed by prior art technique.

For example 3 shown above, the cut off elements computed by the disclosed system was determined to be (8, 19, 11, 12). No cut offs were computed by the prior art forecasting for this example. This results in no cross-validation being performed by the model. This can potentially result in in lower model performance and the generation of inaccurate model prediction results.

Example 4

N=365
H=28
frequency="DAY"
Disclosed System cutoff list (181, 207, 233, 259, 285, 311, 337)
Prior Art Technique cutoff list (85, 99, 113, 127, 141, 155, 169, 183, 197, 211, 225, 239, 253, 267, 281, 295, 309, 323, 337)

As may be observed, the cut off elements computed for the time series dataset by the prior art tool for example 4 resulted in a relatively high number of cutoff elements. A high number of cutoffs can potentially result in a computationally expensive cross-validation process as described above.

Example 5

N=500
H=30
frequency="DAY"
Disclosed System cutoff list (253, 284, 315, 346, 377, 408, 439, 470)
Prior Art Technique cutoff list (95, 110, 125, 140, 155, 170, 185, 200, 215, 230, 245, 260, 275, 290, 305, 320, 335, 350, 365, 380, 395, 410, 425, 440, 455, 470)

The cut off elements computed for the time series dataset by the prior art tool for example 5 resulted in a relatively high number of cutoff elements which may potentially result in a computationally expensive cross-validation process.

Example 6

N=730
H=30
frequency="DAY"
Disclosed System cutoff list (376, 412, 448, 484, 520, 556, 592, 628, 664, 700)
Prior Art Technique cutoff list (100, 115, 130, 145, 160, 175, 190, 205, 220, 235, 250, 265, 280, 295, 310, 325, 340, 355, 370, 385, 400, 415, 430, 445, 460, 475, 490, 505, 520, 535, 550, 565, 580, 595, 610, 625, 640, 655, 670, 685, 700)

The cut off elements computed for the time series dataset by the prior art tool for example 6 resulted in a relatively high number of cutoff elements which may potentially result in a computationally expensive cross-validation process.

Example 7

N=5000
H=90
frequency="DAY"
Disclosed System cutoff list (3479, 3638, 3797, 3956, 4115, 4274, 4433, 4592, 4751, 4910)
Prior Art Technique cutoff list (275, 320, 365, 410, 455, 500, 545, 590, 635, 680, 725, 770, 815, 860, 905, 950, 995, 1040, 1085, 1130, 1175, 1220, 1265, 1310, 1355, 1400, 1445, 1490, 1535, 1580, 1625, 1670, 1715, 1760, 1805, 1850, 1895, 1940, 1985, 2030, 2075, 2120, 2165, 2210, 2255, 2300, 2345, 2390, 2435, 2480, 2525, 2570, 2615, 2660, 2705, 2750, 2795, 2840, 2885, 2930, 2975, 3020, 3065, 3110, 3155, 3200, 3245, 3290, 3335, 3380, 3425, 3470, 3515, 3560, 3605, 3650, 3695, 3740, 3785, 3830, 3875, 3920, 3965, 4010, 4055, 4100, 4145, 4190, 4235, 4280, 4325, 4370, 4415, 4460, 4505, 4550, 4595, 4640, 4685, 4730, 4775, 4820, 4865, 4910)

The cut off elements computed for the time series dataset by the prior art tool for example 7 resulted in a relatively high number of cutoff elements which may potentially result in a computationally expensive cross-validation process.

Example 8

N=60
H=1
frequency="MONTH"
Disclosed System cutoff list (41, 43, 45, 47, 49, 51, 53, 55, 57, 59)
Prior Art Technique cutoff list (3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59)

The cut off elements computed for the time series dataset by the prior art tool for example 8 resulted in a relatively high number of cutoff elements which may potentially result in a computationally expensive cross-validation process.

Example Implementation

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
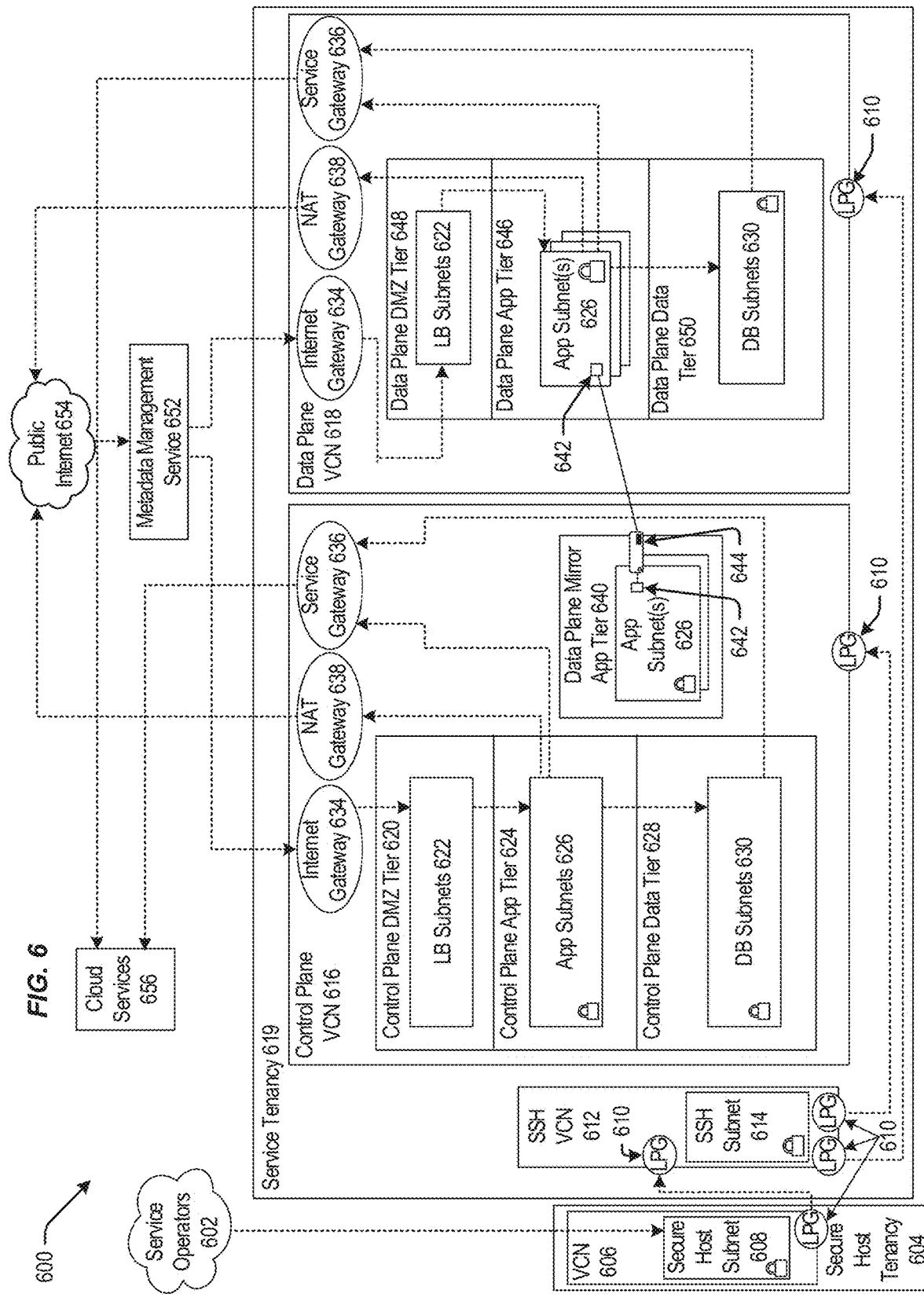
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
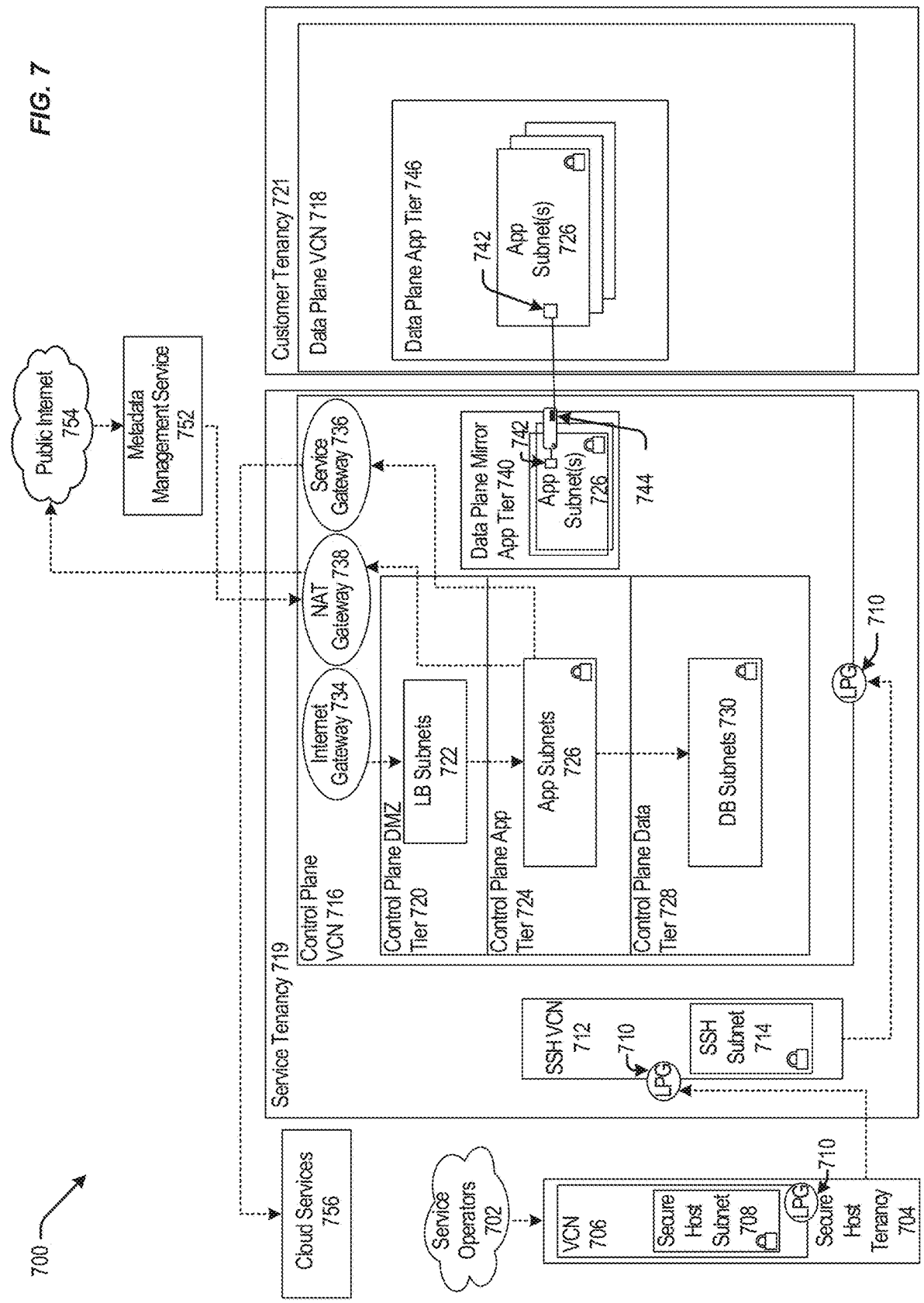
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
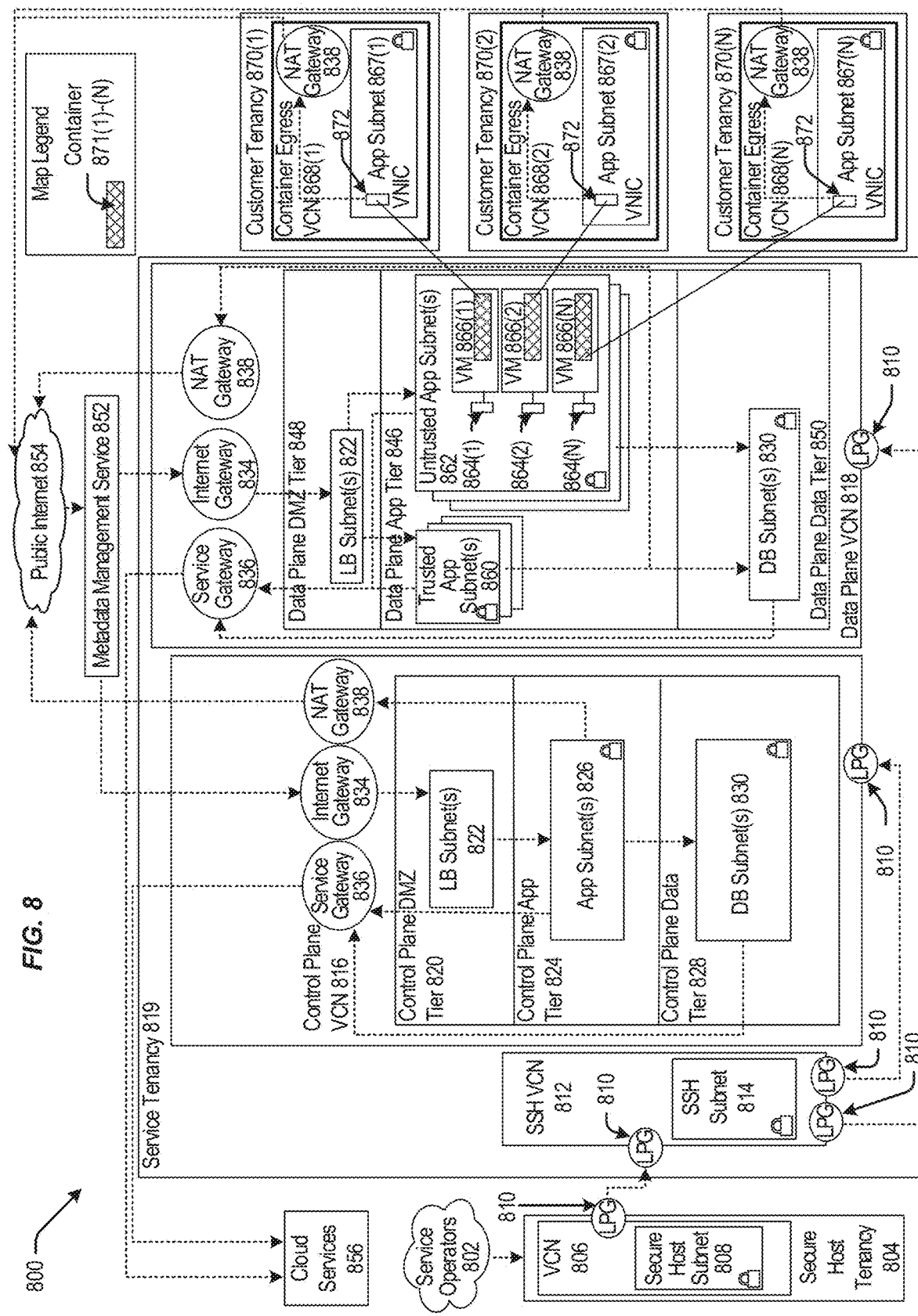
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
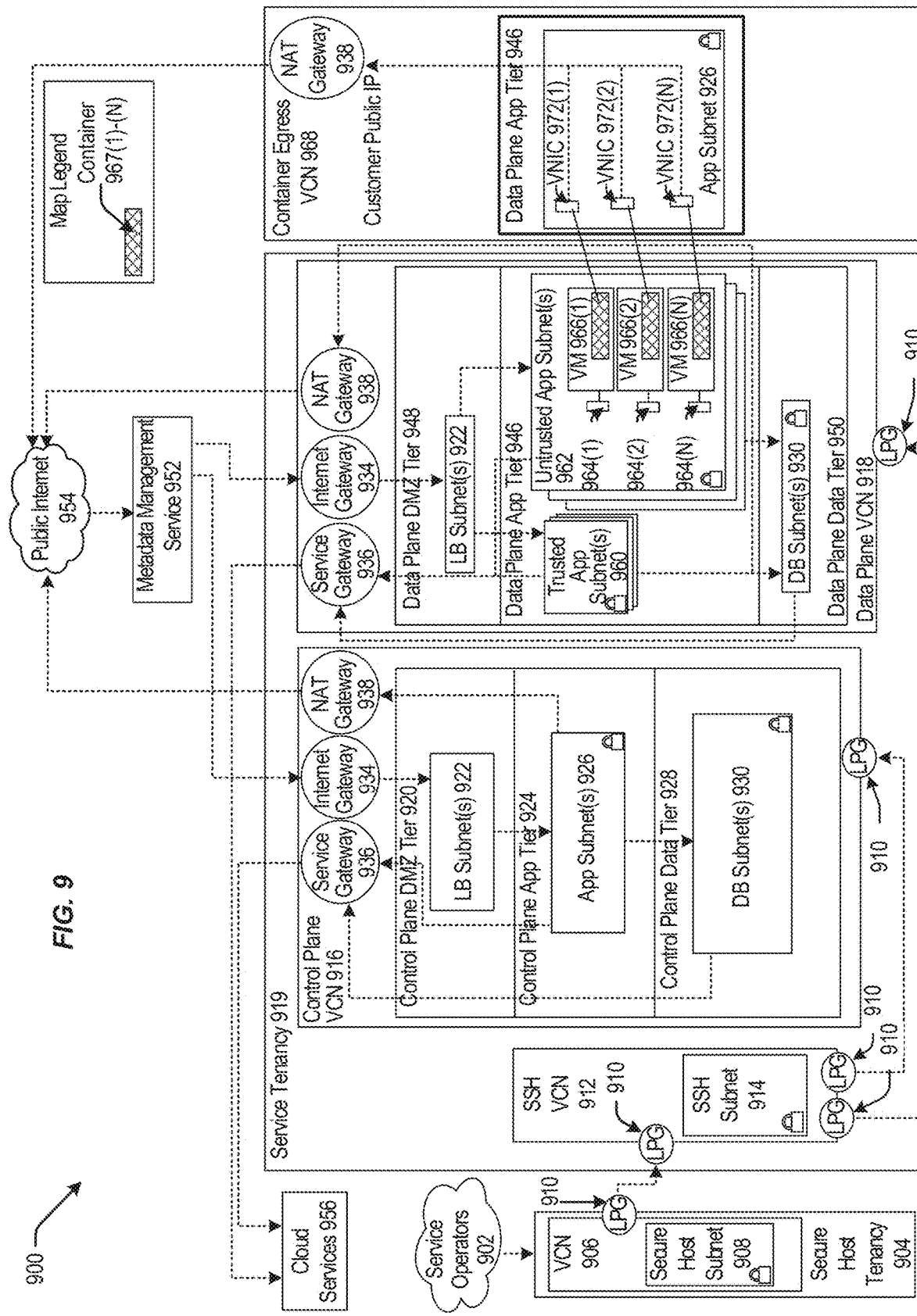
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
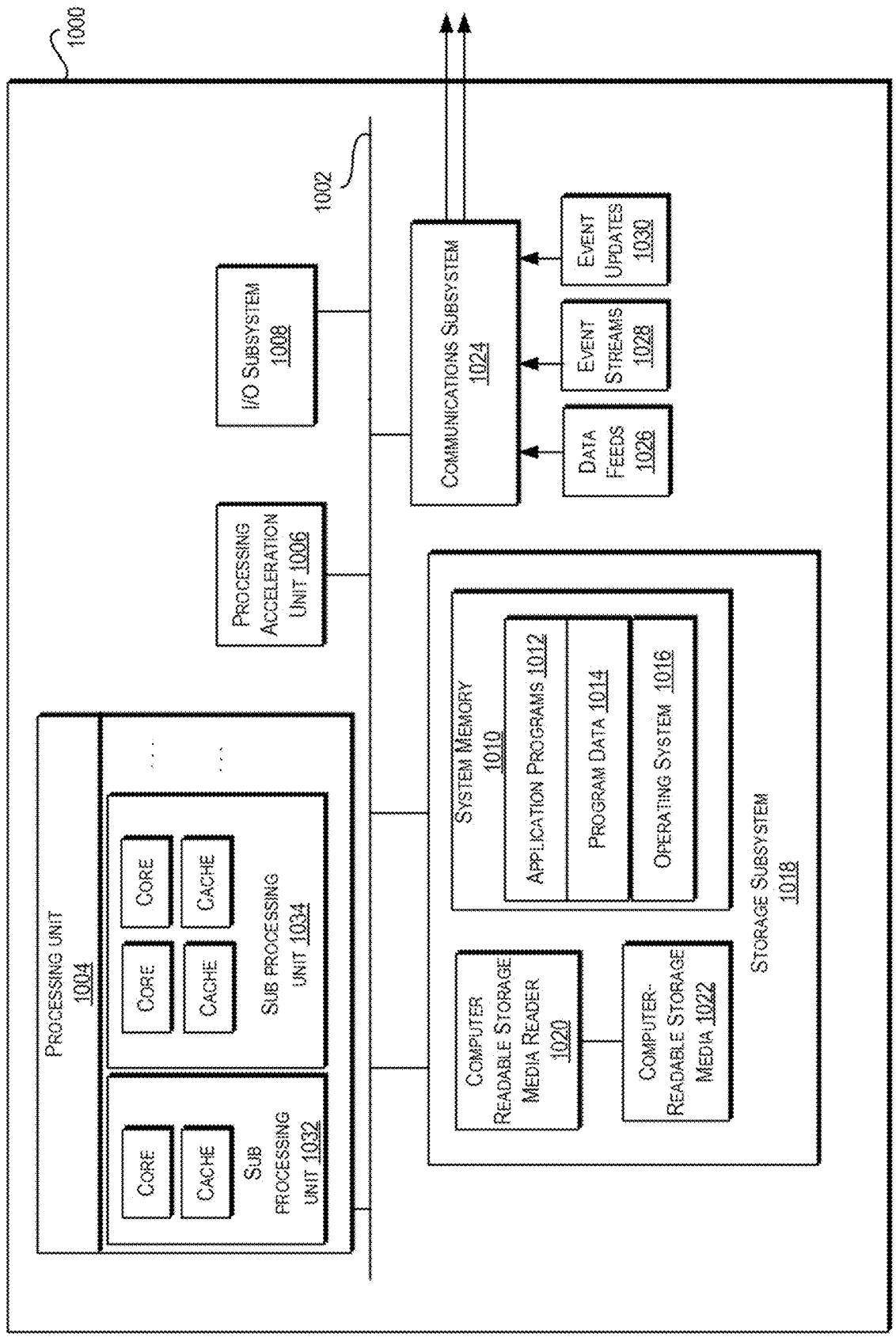
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   identifying, by a computing system, a set of one or more cross-validation parameters to be used for cross-validating a model to be used for generating a requested forecast, wherein the requested forecast includes a time series dataset and a forecast horizon identifying a number of time steps for which a forecast is to be made using the time series dataset;
   identifying, by the computing system, an objective function to be minimized for determining optimal values for the set of one or more cross-validation parameters;
   identifying, by the computing system, a set of constraints for one or more cross-validation parameters from the set of cross-validation parameters, wherein the objective function is represented as a set of penalty terms, and wherein:
      a first penalty term in the set of penalty terms represents a cost of violation of a first constraint in the set of constraints on a first cross-validation parameter in the set of cross-validation parameters, wherein the first cross-validation parameter represents a left most fold cross-validation parameter for cross-validating the model; and
      a second penalty term in the set of penalty terms represents a cost of violation of a second constraint in the set of constraints on a second cross-validation parameter in the set of cross-validation parameters, wherein the second cross-validation parameter represents a gap between the folds cross-validation parameter for cross-validating the model;
   using, by the computing system, an optimization technique to determine the optimal values for the set of cross-validation parameters, wherein the optimal values for the set of cross-validation parameters is determined by:
      determining one or more combinations of values to be assigned to the set of cross-validation parameters, wherein the set of cross validation parameters comprise the left most fold cross-validation parameter, the gap between the folds cross-validation parameter and a number of folds cross-validation parameter;
      for each combination of values from the one or more combinations of values, computing a penalty value for the combination of values; and
      determining the optimal values for the set of cross-validation parameters by selecting the combination of values from the one or more combinations of values that has the lowest penalty value; and
   using, by the computing system, the optimal values determined for the set of cross-validation parameters to perform cross-validation of the model to be used for making the requested forecast.

2. The method of claim 1, wherein the first penalty term is expressed as a divergence of the left most fold cross-validation parameter from an ideal value of the left most fold cross-validation parameter weighted by a first weight value.

3. The method of claim 1, wherein the second penalty term is expressed as a divergence of the gap between the folds cross-validation parameter from an ideal value of the gap between the folds cross-validation parameter weighted by a second weight value.

4. The method of claim 1, wherein the objective function comprises a third penalty term, wherein the third penalty term represents a cost of violation of the first constraint on the left most fold cross-validation parameter when the left most fold cross-validation parameter is out of bounds.

5. The method of claim 1, wherein the objective function is represented as a sum of the penalty terms and wherein the optimal values for the cross-validation parameters are obtained by determining a sum of the penalty terms that minimizes the objective function.

6. The method of claim 1 further comprising:
   identifying a set of models to be evaluated;
   for each model in the set of models, training the model and cross-validating the trained model in the set of models using the optimal values for the set of cross-validation parameters; and
   for each model in the set of models, computing an accuracy metric for the model based on the training and cross-validation.

7. The method of claim 6 further comprising:
   selecting a model from the set of models based upon the accuracy metric; and
   using the selected model to generate a forecast value for the forecast requested.

8. The method of claim 7, further comprising communicating the forecast value as a response to the forecast request.

9. The method of claim 6 further comprising creating a set of one or more folds in the time series dataset, wherein the number of folds in the set of folds is determined based on the optimal value of the first cross-validation parameter in the set of cross-validation parameters, wherein the first cross-validation parameter represents a left most fold cross-validation parameter for cross-validating the model.

10. The method of claim 9, further comprising generating an accuracy metric for the model for each fold in the set of folds and computing the accuracy metric for the model based on the accuracy metrics computed for each fold in the set of folds.

11. A time series forecasting service system comprising:
   a memory; and
   one or more processors configured to perform processing, the processing comprising:
      identifying a set of one or more cross-validation parameters to be used for cross-validating a model to be used for generating a requested forecast, wherein the requested forecast includes a time series dataset and a forecast horizon identifying a number of time steps for which a forecast is to be made using the time series dataset;

identifying an objective function to be minimized for determining optimal values for the set of one or more cross-validation parameters;

identifying a set of constraints for one or more cross-validation parameters from the set of cross-validation parameters, wherein the objective function is represented as a set of penalty terms, and wherein:

a first penalty term in the set of penalty terms represents a cost of violation of a first constraint in the set of constraints on a first cross-validation parameter in the set of cross-validation parameters, wherein the first cross-validation parameter represents a left most fold cross-validation parameters for cross-validating the model; and a second penalty term in the set of penalty terms represents a cost of violation of a second constraint in the set of constraints on a second cross-validation parameter in the set of cross-validation parameters, wherein the second cross-validation parameter represents a gap between the folds cross-validation parameter for cross-validating the model;

using an optimization technique to determine the optimal values for the set of cross-validation parameters, wherein the optimal values for the set of cross-validation parameters is determined by:

determining one or more combinations of values to be assigned to the set of cross-validation parameters, wherein the set of cross validation parameters comprise the left most fold cross-validation parameter, the gap between the folds cross-validation parameter and a number of folds cross-validation parameter;

for each combination of values from the one or more combinations of values, computing a penalty value for the combination of values; and determining the optimal values for the set of cross-validation parameters by selecting the combination of values from the one or more combinations of values that has the lowest penalty value; and using the optimal values determined for the set of cross-validation parameters to perform cross-validation of the model to be used for making the requested forecast.

12. The system of claim 11, wherein the first penalty term is expressed as a divergence of the left most fold cross-validation parameter from an ideal value of the left most fold cross-validation parameter weighted by a first weight value.

13. The system of claim 11, wherein the second penalty term is expressed as a divergence of the gap between the folds cross-validation parameter from an ideal value of the gap between the folds cross-validation parameter weighed by a second weight value.

14. The system of claim 11, wherein the objective function comprises a third penalty term, wherein the third penalty term represents a cost of violation of the first constraint on the left most fold cross-validation parameter when the left most fold cross-validation parameter is out of bounds.

15. The system of claim 11, wherein the objective function is represented as a sum of the penalty terms and wherein the optimal values for the cross-validation parameter are obtained by determining a sum of the penalty terms that minimizes the objective function.

16. The system of claim 11 further comprising:
identifying a set of models to be evaluated;
for each model in the set of models, training the model and cross-validating the trained model in the set of models using the optimal values for the set of cross-validation parameters; and
for each model in the set of models, computing an accuracy metric for the model based on the training and validation.

17. A non-transitory computer-readable medium having program code that is stored thereon, the program code executable by one or more processing devices for performing operations comprising:

identifying a set of one or more cross-validation parameters to be used for cross-validating a model to be used for generating a requested forecast, wherein the requested forecast includes a time series dataset and a forecast horizon identifying a number of time steps for which a forecast is to be made using the time series dataset;

identifying an objective function to be minimized for determining optimal values for the set of one or more cross-validation parameters;

identifying a set of constraints for one or more cross-validation parameters from the set of cross-validation parameters, wherein the objective function is represented as a set of penalty terms, and wherein:

a first penalty term in the set of penalty terms represents a cost of violation of a first constraint in the set of constraints on a first cross-validation parameter in the set of cross-validation parameters, wherein the first cross-validation parameter represents a left most fold cross-validation parameters for cross-validating the model; and a second penalty term in the set of penalty terms represents a cost of violation of a second constraint in the set of constraints on a second cross-validation parameter in the set of cross-validation parameters, wherein the second cross-validation parameter represents a gap between the folds cross-validation parameter for cross-validating the model;

using an optimization technique to determine the optimal values for the set of cross-validation parameters, wherein the optimal values for the set of cross-validation parameters is determined by:

determining one or more combinations of values to be assigned to the set of cross-validation parameters, wherein the set of cross validation parameters comprise the left most fold cross-validation parameter, the gap between the folds cross-validation parameter and a number of folds cross-validation parameter;

for each combination of values from the one or more combinations of values, computing a penalty value for the combination of values; and determining the optimal values for the set of cross-validation parameters by selecting the combination of values from the one or more combinations of values that has the lowest penalty value; and using the optimal values determined for the set of cross-validation parameters to perform cross-validation of the model to be used for making the requested forecast.

18. The non-transitory computer-readable medium of claim 17, further comprising:
identifying a set of models to be evaluated;
for each model in the set of models, training the model and cross-validating the trained model in the set of models using the optimal values for the set of cross-validation parameters; and for each model in the set of models, computing an accuracy metric for the model based on the training and validation.

19. The non-transitory computer-readable medium of claim 18, further comprising:

selecting a model from the set of models based upon the accuracy metric; and using the selected model to generate a forecast value for the forecast requested.

20. The non-transitory computer-readable medium of claim 19, further comprising communicating the forecast value as a response to the forecast request.

* * * * *